US012688103B2

(12) United States Patent
B S et al.

(10) Patent No.: US 12,688,103 B2
(45) Date of Patent: Jul. 21, 2026

(54) AUTOMATIC CREATION OF INTERNET-OF-THINGS DEVICE DESCRIPTORS

(71) Applicant: Cisco Technology, Inc., San Jose, CA (US)

(72) Inventors: Rakesh B S, Bangalore (IN); Priyanka Bansal, Bangalore (IN); Robert Edgar Barton, Richmond (CA); Arun Kumar Subramanian, Chennai (IN); Gopikrishnan Gopalsamy, Coimbatore (IN); Parthasarathy Kesavaraj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 18/799,405

(22) Filed: Aug. 9, 2024

(65) Prior Publication Data

US 2026/0044424 A1     Feb. 12, 2026

(51) Int. Cl.
| | |
|---|---|
| *G06F 15/173* | (2006.01) |
| *G06F 11/30* | (2006.01) |
| *G06F 15/177* | (2006.01) |
| *G16Y 40/20* | (2020.01) |
| *G16Y 40/50* | (2020.01) |

(52) U.S. Cl.
CPC .......... *G06F 11/3006* (2013.01); *G16Y 40/20* (2020.01); *G16Y 40/50* (2020.01)

(58) Field of Classification Search
CPC . G06F 11/3006; G06F 11/3051; G16Y 40/10; G16Y 40/20; G16Y 40/50

USPC .................................. 709/223–224, 220–222
See application file for complete search history.

(56) References Cited

U.S. PATENT DOCUMENTS

| | | | |
|---|---|---|---|
| 10,944,638 B1 * | 3/2021 | Chamarajnager ... | H04L 41/0843 |
| 11,411,999 B2 * | 8/2022 | Jin ......................... | G06F 30/13 |
| 11,632,428 B2 * | 4/2023 | Tikhomirov ............ | H04L 67/34 |
| | | | 709/220 |
| 12,028,708 B2 * | 7/2024 | Frey ........................ | H04B 5/20 |
| 2019/0319861 A1 * | 10/2019 | Pan ..................... | H04L 41/5019 |
| 2020/0053595 A1 * | 2/2020 | Britt ...................... | H04W 28/10 |

(Continued)

OTHER PUBLICATIONS

Pashamokhtari A., et al., "PicP-MUD: Profiling Information Content of Payloads in MUD Flows for IoT Devices", 2022 IEEE 23rd International Symposium on a World of Wireless, Mobile and Multimedia Networks (WoWMoM), Jun. 14-17, 2022, 6 Pages.

*Primary Examiner* — Bharat Barot
(74) *Attorney, Agent, or Firm* — Polsinelli P.C.

(57) ABSTRACT

The present technology automates the process of collecting and using data from IoT devices to improve IoT security and management while limiting the manual entry requirements of conventional IoT platforms. The technology receives data from IoT devices and determines behavioral characterizations of the IoT devices based on the data. The technology then uses a generative model to create a file representative of the behavioral characterizations of the IoT device, and uses that file to represent new IoT devices with similar attributes to those represented by the file. In doing so, the technology can improve security by, for example, creating a MUD file representative of a new IoT device with no associated MUD file. The technology can also create a file representative of the IoT device to improve onboarding of an IoT device in, for example, an IoT operations dashboard.

17 Claims, 6 Drawing Sheets

(56) References Cited

U.S. PATENT DOCUMENTS

| | | | | |
|---|---|---|---|---|
| 2020/0145409 A1* | 5/2020 | Pochuev | ............. | H04L 63/0853 |
| 2020/0412664 A1* | 12/2020 | Ramachandra | ....... | G06F 16/252 |
| 2021/0067411 A1* | 3/2021 | Grant | ................. | H04L 41/0816 |
| 2022/0086070 A1 | 3/2022 | Sivaraman et al. | | |
| 2022/0263820 A1 | 8/2022 | Barton et al. | | |
| 2022/0360562 A1 | 11/2022 | Hanes et al. | | |
| 2023/0124811 A1* | 4/2023 | Jiménez | ................. | G16Y 30/10 |
| | | | | 726/29 |
| 2024/0171654 A1 | 5/2024 | Beddus et al. | | |
| 2024/0205257 A1* | 6/2024 | Divakaran | .......... | H04L 63/1433 |

* cited by examiner

300

RECEIVING DATA INDICATING ATTRIBUTES OF A FIRST IOT DEVICE 302

PROMPTING A GENERATIVE MODEL TO CREATE A FILE BASED ON THE DATA 304

DETERMINING, BY A NETWORK CONTROLLER, THAT A SECOND IOT DEVICE IS A SAME TYPE OF DEVICE AS THE FIRST IOT DEVICE 306

ASSOCIATING THE FILE WITH THE SECOND IOT DEVICE 308

AUTOMATIC CREATION OF INTERNET-OF-THINGS DEVICE DESCRIPTORS

BACKGROUND

The proliferation of Internet of Things (IoT) devices has led to an unprecedented increase in the volume of data generated and collected from various sensors and smart devices. These devices, ranging from home automation systems to industrial sensors, generate continuous streams of data that can be used for monitoring and controlling various applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
FIG. 1 illustrates an IoT system in accordance with some embodiments of the present technology.
Figure 1:
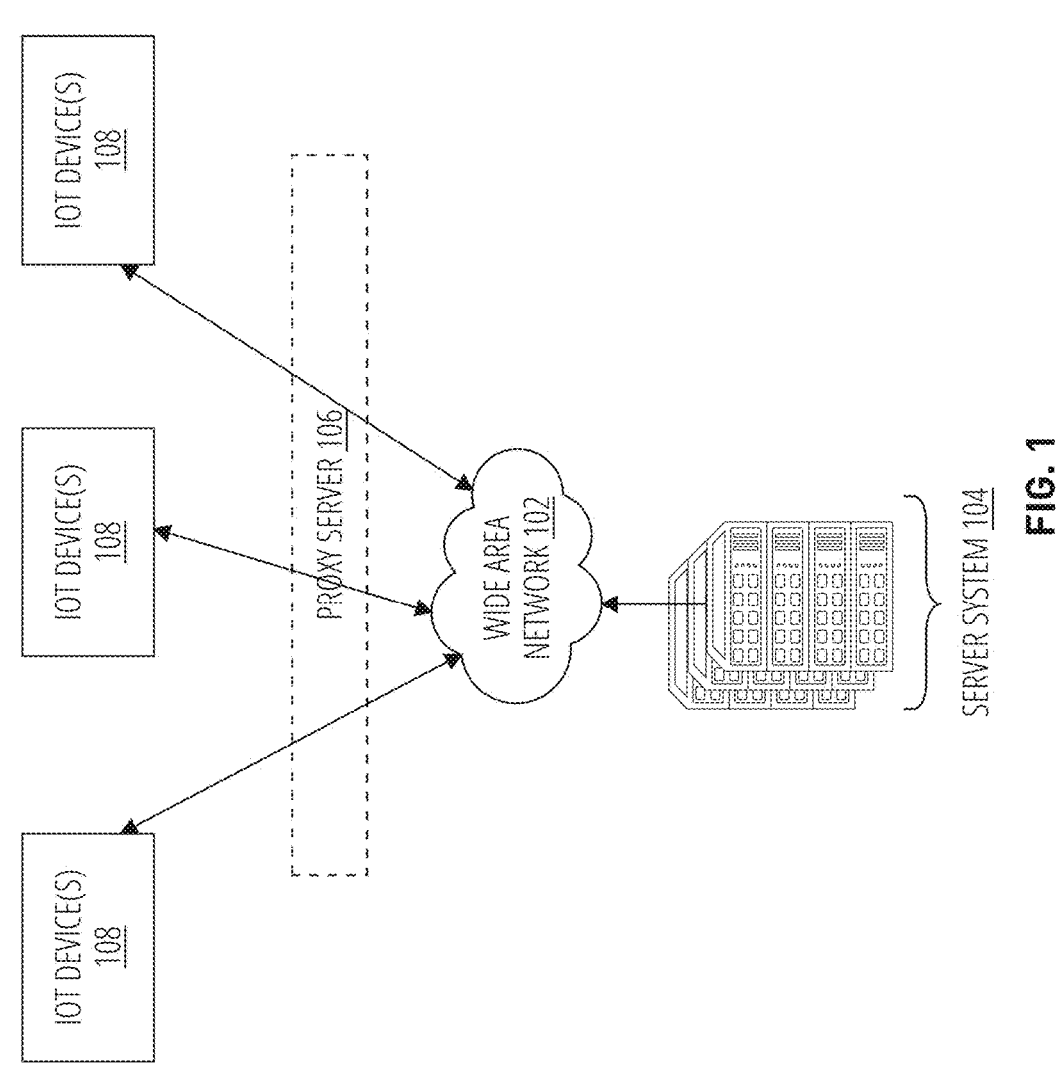

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Rapid growth is often a messy process. American cities such as Austin, Texas or Seattle, Washington have seen significant population increase over the past twenty years. Economic forces have lured many to these areas in hopes of obtaining one of the many higher-paying jobs. But the population increase has also led to infrastructure problems such as worsening traffic and difficulty scaling the power grid to account for the new residents.

The technology world is no different. Take, for example, the recent surge of IoT devices across worldwide networks. Some estimates suggest there may be two IoT devices for every person living on the planet. And most of this growth has occurred in the past fifteen years. But, much like urban growth, the commercial growth of the IoT industry has led to infrastructure problems as well. For example, the various types of IoT devices are seemingly endless and have different data processing needs. An IoT thermostat will store temperature data, time data, power usage data, and so forth. While a video doorbell may primarily store image or video data. The different forms of data require standardized processes that harmonize the different IoT devices connected together in a same or similar network.

The networks that enable IoT devices are also encountering onboarding and maintenance issues. Some IoT devices lack standardized files that harmonize the IoT devices across the network in which they reside. For example, a Manufacturer Usage Description (MUD) file is a file associated with an IoT device that allows device manufacturers to specify the types of network communications their devices should engage in. IoT devices with MUD files can operate more efficiently and securely on a network, but those without a MUD file may suffer from efficiency or security concerns.

Management of IoT devices has also been challenging with the recent surge in the IoT market. An IoT operations dashboard is a graphical user interface that provides real-time monitoring, management, and control of IoT devices and their data. But, onboarding of devices onto an IoT operations dashboard typically requires the manual entry of attribute information such as the name, type, location, configuration settings, and data parameters of the IoT device. Users find this manual entry requirement to be cumbersome, especially given the large number of devices that need to be added to the dashboard.

The present technology automates the process of collecting and using data from IoT devices to improve IoT security and management while limiting the manual entry requirements of conventional IoT platforms. The technology receives data from IoT devices and determines behavioral characterizations of the IoT devices based on the data. The technology then uses a generative model to create a file representative of the behavioral characterizations of the IoT device and uses that file to represent new IoT devices with similar attributes to those represented by the file. In doing so, the technology can improve security by, for example, creating a MUD file representative of a new IoT device with no associated MUD file. The technology can also create a file representative of the IoT device to improve onboarding of an IoT device in, for example, an IoT operations dashboard.

OVERVIEW

The presently disclosed embodiments include a method including receiving data indicating attributes of a first IoT device, prompting a generative model to create a file based on the data, determining, by a network controller, that a second IoT device is a same type of device as the first IoT device, and associating the file with the second IoT device.

The presently disclosed embodiments also include a network controller including a storage configured to store instructions and at least one processor configured to execute the instructions. The instructions are configured to cause the at least one processor to receive data indicating attributes of a first IoT device, prompt a generative model to create a file based on the data, determine that a second IoT device is a same type of device as the first IoT device, and associate the file with the second IoT device.

The presently disclosed embodiments further include a non-transitory computer-readable storage medium including instructions that, when executed by at least one processor, cause the at least one processor to perform various steps. For example, the at least one processor can receive data indicating attributes of a first IoT device, prompt a generative model to create a file based on the data, determine that a second IoT device is a same type of device as the first IoT device, and associate the file with the second IoT device.

EXAMPLE EMBODIMENTS

FIG. 1 illustrates an IoT system 100 according to at least one of the presently disclosed embodiments. The IoT system 100 can include IoT device(s) 108 communicatively coupled via a wide area network 102 to a server system 104. The IoT device(s) 108 can be any device capable of communicating with another device (including others of the IoT device(s) 108) through the internet. For example, the IoT device(s) 108 can include smart thermostats, wearable health monitors, smart locks, and connected appliances like refrigerators and washing machines, for example. Additionally, the server system 104 may utilize cloud computing resources to manage data storage and computational tasks and improve scalability and security for the entire IoT system 100.

The network topology of the IoT system 100 is shown as a hub-and-spoke topology. For example, the IoT device(s) 108 may be communicably coupled via a proxy server 106. In this configuration, the IoT device(s) 108 have a 1:1 communication channel to the server system 104 and communicate with each other, if at all, via the server system 104. The proxy server 106 may improve the performance of the IoT system 100 by mirroring some or all of the state of the server system 104 and thus enabling the IoT device(s) 108 to communicate without creating bandwidth or incurring the latency of the wide area network 102. The proxy server 106 can be located at a facility or a nearby facility to where the IoT device(s) 108 are located.

Other topologies can be implemented without departing from the spirit and scope of the present disclosure. For example, the IoT system 100 can be configured using a mesh topology where each of the IoT device(s) 108 acts as a node that can directly communicate with multiple other nodes, creating a network with no single point of failure. This approach enhances network resilience and enables more efficient data distribution among the IoT device(s) 108. Alternatively, a peer-to-peer (P2P) communication can be enabled, allowing the IoT device(s) to interact directly without needing to pass through the proxy server 106 or the server system 104. This topology can further reduce latency and enhance real-time data processing capabilities. Each topology offers distinct advantages and can be selected based on specific requirements such as scale, security, complexity, and criticality of the IoT applications deployed within the IoT system 100.

Figure 2:
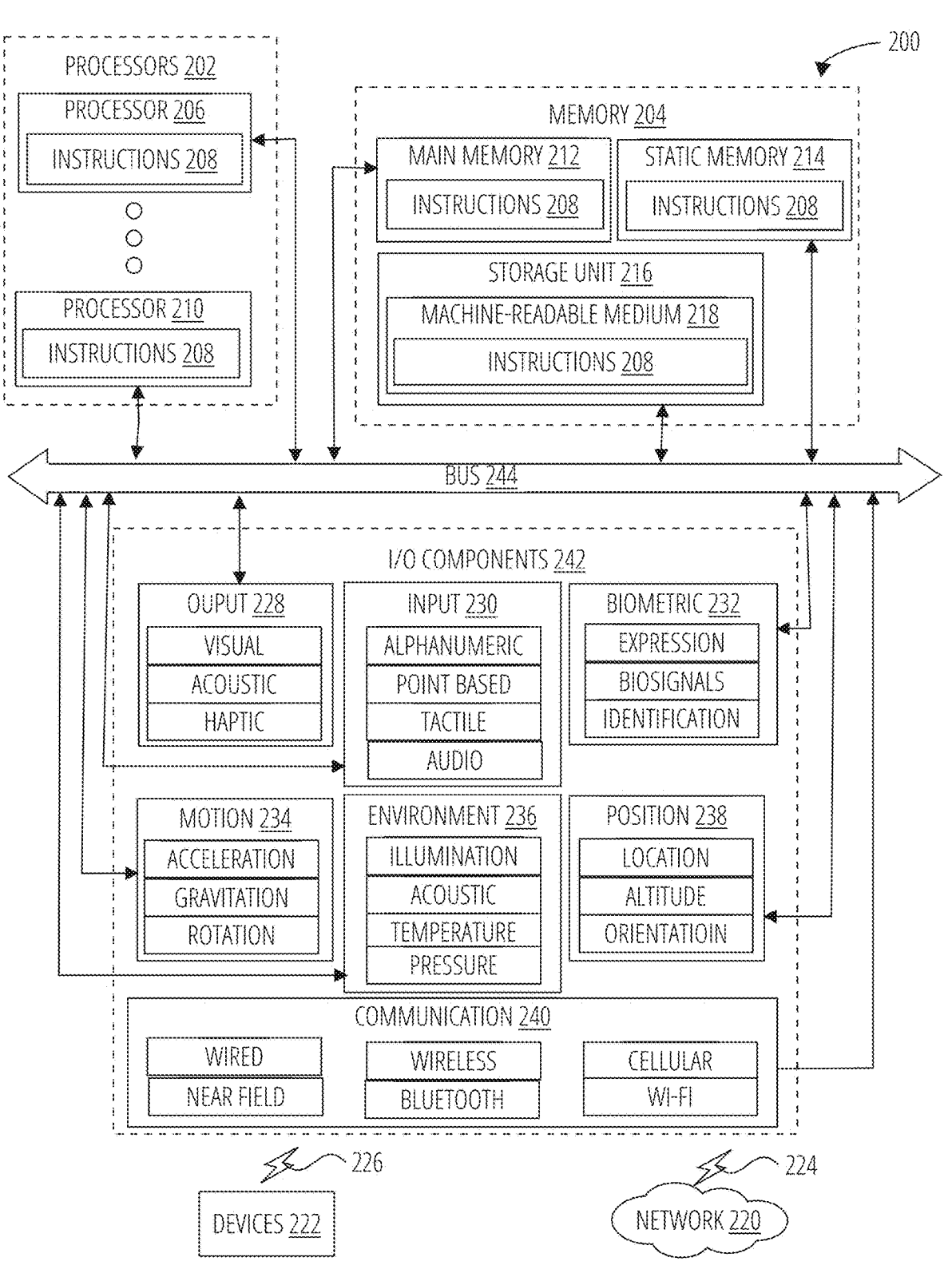
FIG. 2 illustrates a diagrammatic representation of an IoT device in the form of a computer system within which a set of instructions may be executed for causing the machine to perform any one or more of the IoT functionalities discussed herein, in accordance with some embodiments of the present technology.

FIG. 2 illustrates a diagrammatic representation of an IoT device 200 in the form of a computer system within which a set of instructions may be executed for causing the IoT device 200 to perform any one or more of the methodologies discussed herein, according to an example embodiment. The IoT device 200 shown in FIG. 2 can be, for example, any of the IoT device(s) 108 illustrated in FIG. 1. FIG. 2 shows a diagrammatic representation of the IoT device 200 in the example form of a computer system, within which instructions 208 (e.g., software, a program, an application, an applet, an app, or other executable code) for causing the IoT device 200 to perform any one or more of the methodologies discussed herein may be executed.

The instructions 208 transform the general, non-programmed IoT device 200 into a particular IoT device 200 programmed to carry out the described and illustrated functions in the manner described. In alternative embodiments, the IoT device 200 operates as a standalone device or may be coupled (e.g., networked) to other machines. In a networked deployment, the IoT device 200 may operate in the capacity of a server machine or a client machine in a server-client network environment, or as a peer machine in a peer-to-peer (or distributed) network environment. The IoT device 200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), a security camera, other smart devices, a web appliance, a network router, a network switch, a network bridge, or any machine capable of executing the instructions 208, sequentially or otherwise, that specify actions to be taken by the IoT device 200.

Further, while only a single IoT device 200 is illustrated, the term "machine" shall also be taken to include a collection of machines that individually or jointly execute the instructions 208 to perform any one or more of the methodologies discussed herein.

The IoT device 200 may include processors 202, memory 204, and I/O components 242, which may be configured to communicate with each other such as via a bus 244. In an example embodiment, the processors 202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 206 and a processor 210 that may execute the instructions 208. The term "processor" is intended to include multi-core processors that may comprise two or more independent processors (sometimes referred to as "cores") that may execute instructions contemporaneously. Although FIG. 2 shows multiple processors 202, the IoT device 200 may include a single processor with a single core, a single processor with multiple cores (e.g., a multi-core processor), multiple processors with a single core, multiple processors with multiples cores, or any combination thereof.

The memory 204 may include a main memory 212, a static memory 214, and a storage unit 216, both accessible to the processors 202 such as via the bus 244. The main memory 204, the static memory 214, and storage unit 216 store the instructions 208 embodying any one or more of the methodologies or functions described herein. The instructions 208 may also reside, completely or partially, within the main memory 212, within the static memory 214, within machine-readable medium 218 within the storage unit 216, within at least one of the processors 202 (e.g., within the processor's cache memory), or any suitable combination thereof, during execution thereof by the IoT device 200.

The I/O components 242 may include a wide variety of components to receive input, provide output, produce output, transmit information, exchange information, capture measurements, and so on. The specific I/O components 242 that are included in a particular machine will depend on the type of machine. For example, portable machines such as mobile phones will likely include a touch input device or other such input mechanisms, while a headless server machine will likely not include such a touch input device. It will be appreciated that the I/O components 242 may include many other components that are not shown in FIG. 2. The I/O components 242 are grouped according to functionality merely for simplifying the following discussion and the grouping is in no way limiting. In various example embodiments, the I/O components 242 may include output components 228 and input components 230. The output components 228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 242 may include biometric components 232, motion components 234, environmental components 236, or position components 238, among a wide array of other components. For example, the biometric components 232 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 234 may include acceleration sensor components (e.g., accelerometer), gravitation sensor components, rotation sensor components (e.g., gyroscope), and so forth. The environmental components 236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 242 may include communication components 240 operable to couple the IoT device 200 to a network 220 or devices 222 via a coupling 224 and a coupling 226, respectively. For example, the communication components 240 may include a network interface component or another suitable device to interface with the network 220. In further examples, the communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 222 may be another machine or any of a wide variety of peripheral devices (e.g., a peripheral device coupled via a USB).

Moreover, the communication components 240 may detect identifiers or include components operable to detect identifiers. For example, the communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as location via Internet Protocol (IP) geolocation, location via Wi-Fi® signal triangulation, location via detecting an NFC beacon signal that may indicate a particular location, and so forth.

The various memories (i.e., memory 204, main memory 212, static memory 214, and/or memory of the processors 202) and/or storage unit 216 may store one or more sets of instructions and data structures (e.g., software) embodying or utilized by any one or more of the methodologies or functions described herein. These instructions (e.g., the instructions 208), when executed by processors 202, cause various operations to implement the disclosed embodiments.

Figure 3:
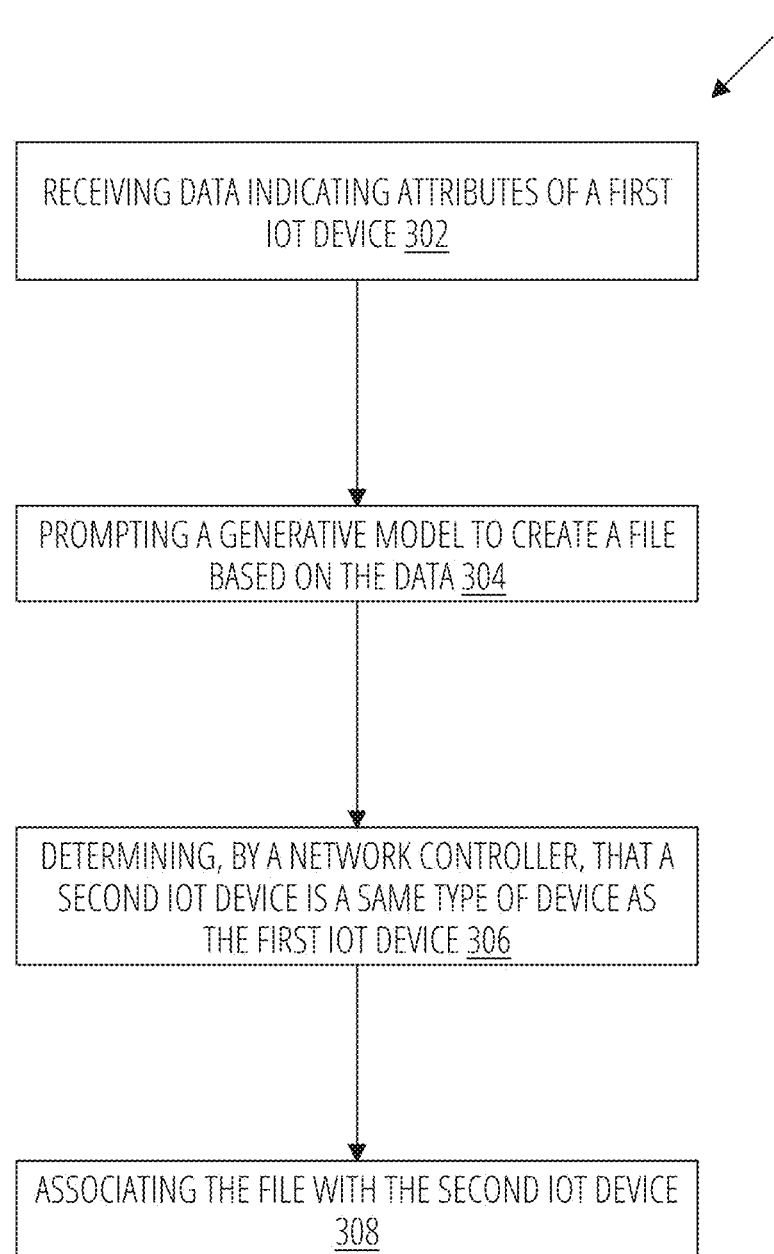
FIG. 3 illustrates a routine for receiving and using IoT device data in accordance with some embodiments of the present technology.

FIG. 3 illustrates a method 300 for receiving and using IoT device data in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The method 300 provides significant value by improving security and reducing the administrative difficulties associated with onboarding of IoT devices, for example, in generating a security policy based on a MUD profile or into a IoT operations dashboard. According to some examples, the method 300 includes receiving data indicating attributes of a first IoT device at block 302. For example, the server system 104 illustrated in FIG. 1 may receive data indicating attributes of a first IoT device, e.g., one of the IoT device(s) 108 described in FIG. 1 or the IoT device 200 in FIG. 2 (for ease of reference, these devices will be referred to as an "IoT device"). The collected data may include connectivity data, attribute data, and attribute access procedure data. For example, the collected data may include network status indicators such as signal strength and latency, device-specific attributes such as firmware version, sensor readings (e.g., temperature, humidity, or motion detection), battery level, operational status, and location data. Additionally, attribute access procedure data may include information on how the attributes are accessed or modified, including security protocols used, access frequency, and any errors encountered during access attempts.

The data can also include a manual identifying attributes of the first IoT device, for example, a sensor manual. A sensor manual for an IoT device is a comprehensive document that provides detailed information and instructions regarding the sensors integrated into or used with the IoT device. The data contained within the sensor manual can be used to extract behavioral characteristics of the IoT device so that the method 300 may later create a file representative of those behavioral characteristics and then associate that file with other IoT devices containing the same or similar behavioral characteristics. For example, such data can include sensor types, measurement ranges, accuracy levels, response times, calibration procedures, and operating conditions. Additionally, it may encompass data regarding sensor communication protocols, power consumption, typical data output formats, and recommended usage practices. This data may form all or part of the data later used to create the file representative of behavioral characteristics, in some embodiments.

This sensor manual can be provided manually by human transmission or, alternatively or in addition to the above, the server system 104 can retrieve this manual based on an identifier received in data from the IoT device. For example, the IoT device may include data representing various sensors by transmitting metadata that specifies the types, models, and configuration parameters of the sensors it incorporates. This metadata can include unique identifiers, manufacturer details, sensor capabilities, and operational requirements. By using these identifiers, the server system 104 can automatically fetch the corresponding sensor manuals from a centralized database or online repository, helping to ensure that the most accurate and up-to-date data is available.

The process of receiving the data can occur in any manner. For example, the method 300 may receive the data by analyzing data packets from the first IoT device or the second IoT device with a Transmission Control Protocol dump (TCP dump). A TCP dump is a command-line network packet analyzer used to capture and display the data packets transmitted over a network. It provides detailed information about the packets, such as source and destination IP addresses, protocol types, and payload data, making it a valuable tool for network troubleshooting and security analysis. The term "TCP dump" is a bit of a misnomer, because the term is not limited to just Transmission Control Protocol data. For example, a TCP dump can include packets from various protocols such as UDP (User Datagram Protocol), ICMP (Internet Control Message Protocol), ARP (Address Resolution Protocol), and more. This comprehensive packet capture capability allows users to analyze all types of network traffic, providing valuable insights for troubleshooting, security analysis, and performance monitoring.

According to some examples, the method 300 includes prompting a generative model to create a file based on the data at block 304. For example, the server system 104 illustrated in FIG. 1 may prompt a generative model to create a file based on the data. The generative model may be, but is not limited to, a large language model (LLM). Other forms of generative models may include generative adversarial networks (GANs), Generative Pre-trained Transformers (GPTs), variational autoencoders (VAEs), and recurrent neural networks (RNNs). These models can be used to generate a wide variety of outputs, such as text, images, or structured data, by learning patterns and characteristics from the provided input data.

The method 300 may also include training the generative model with training files that are the same format as the file. These training files provide the generative model with examples that it can learn from, enabling it to understand the structure, attributes, and typical data patterns associated with IoT devices. For example, the training process may involve using historical data from similar IoT devices. In some embodiments, the training files can include MUD files associated with IoT device. In some embodiments, the training files can include configuration files associated with an IoT dashboard. By providing these training files, the generative model can learn relationships regarding what is generally included in these training files and how data in these training files are generally formatted.

The training of the generative model can also include a fine-tuning phase. In the fine-tuning training phase, log data or TCP dump data from an IoT device can be provided to the generative model and the generative model can be asked to create a MUD file or configuration file from the log data or TCP dump data. This data can include sensor readings, device status logs, data transmission data such as ports and IP addresses, and operational parameters. The output of the generative model can then be compared to a MUD file or configuration file for the device that generated the log data or TCP dump data. When the output of the generative model is close to the historical MUD file or configuration file, the generative model can be rewarded, and when the output is lacking, the generative model can be encouraged to learn to be better at producing the MUD file or configuration file.

According to some examples, the method 300 includes determining, by a network controller, that a second IoT device is the same type of device as the first IoT device at block 306. For example, a network controller associated with the server system 104 illustrated in FIG. 1 may determine that a second IoT device is the same type of device as the first IoT device. The network controller or other elements may do so in any manner, for example, by comparing the data representing the first IoT device (e.g., in the step represented by block 302) to data received from the second IoT device. The network controller may also make this determination by analyzing device metadata, comparing device identifiers such as model numbers or serial numbers, or assessing attributes and capabilities reported by the devices. This determination can also involve checking the device manufacturer and firmware versions, cross-referencing configuration profiles, or utilizing machine learning algorithms to match device characteristics.

According to some examples, the method 300 includes associating the file with the second IoT device at block 308. For example, the server system 104 illustrated in FIG. 1 may associate the file with the second IoT device. Examples of such association include where the file is a MUD file and where associating the file with the second IoT device includes storing the MUD file on a MUD server and implementing a MUD policy based on the MUD file. Other examples include uploading the file to an IoT operations dashboard to input the attributes of the first IoT device into the IoT operations dashboard, and later associating that file with a second IoT device based on the common attributes of the first IoT device and the second IoT device. Each of these exemplary embodiments will be discussed in turn.

Again, and for background, a MUD file is a file associated with an IoT device that allows device manufacturers to specify the types of network communications their devices should engage in. IoT devices with MUD files can operate more efficiently and securely on a network, but those without a MUD file may suffer from efficiency or security concerns. According to some embodiments, various services associated with the IoT devices may provide the data that is used to create the MUD file. For example, a security service associated with the MUD file may provide relevant data. Any security service may be used, including intrusion detection systems (IDS), firewalls, and security information and event management (SIEM) systems. These security services may provide any form of relevant data, including access control logs, detected threats, and historical network traffic patterns.

In addition to security services, the use of a TCP log or dump can provide valuable data relevant for creating a MUD file for an IoT device. A TCP log or dump captures detailed information about network traffic, including the source and destination IP addresses, port numbers, and the types of protocols used. By analyzing this data, the method 300 can identify the typical communication patterns and network behavior of the IoT device. For instance, the TCP dump can reveal which external servers the device frequently communicates with, the nature of the data being transmitted, and any unusual or unauthorized connections that might indicate a security risk. This information can be used for defining the permitted network interactions in the MUD file, ensuring that the IoT device engages only in authorized communications. By specifying these communication parameters in the MUD file, the IoT device can be configured to block any unexpected or potentially harmful network traffic.

Based on the data gathered from security services and TCP dumps, several policies can be automatically implemented using the MUD file to enhance the security and efficiency of the IoT device. For example, a policy could be implemented to restrict the IoT device to only communicate with a specific set of IP addresses or domain names that are known to be legitimate and necessary for its operation. This can be referred to as a "whitelist" policy, and can prevent the device from sending data to or receiving data from unauthorized or potentially malicious endpoints. Another policy could limit the range of ports that the device is allowed to use for communication. For example, the IoT device can be restricted to ports for the Hypertext Transfer Protocol Secure (HTTPS) and Hypertext Transfer Protocol (HTTP) protocol, while blocking all others. These policies are typically enforced by the network's MUD controller, part of the network infrastructure responsible for implementing the rules specified in the MUD file. The MUD controller dynamically configures network equipment, such as firewalls and routers, to ensure the IoT device operates within the safe parameters set by the manufacturer, thereby enhancing the overall security and performance of the network.

In some embodiments, the received data can be used to create a file that is later used to onboard an IoT device onto an IoT operations dashboard. Before the present technology, a user was forced to manually add the attributes and other relevant data of the IoT device onto the IoT operations dashboard. Some embodiments of the present disclosure can monitor data traffic and receive other data from the IoT device to better automate this process and reduce administrative challenges.

For example, the method 300 may receive relevant data through a TCP dump or by receiving a sensor manual related to the IoT device, as discussed above. The method 300 may also receive relevant data by querying device attributes using communication protocols such as MQTT (Message Queuing Telemetry Transport) or CoAP (Constrained Application Protocol). This and/or other data can then be used to create a file representative of a first IoT device, which can later be used to automate the onboarding process of a second IoT device onto the IoT operations dashboard. For example, the method 300 may create a JavaScript Object Notation (JSON) or other file that is widely recognized and readable by humans and machines alike. The method 300 is not limited to creating JSON files and may create any file format, such as XML (Extensible Markup Language), CSV (Comma-Separated Values), or YAML (YAML Ain't Markup Language).

Any other manner of learning about the IoT device can be implemented. For example, the method 300 may receive the data from the MUD file associated with the IoT device. The method 300 can do so by retrieving and parsing the MUD file to extract specified network behaviors and communication requirements.

The IoT operations dashboard can autonomously configure itself using the data and corresponding file. This enables dynamic and efficient management of the IoT devices on the network. The process for autonomous configuration can include creating specialized fields to display individual data instances, establishing relationships between various data points, and generating aggregated summaries. For example, upon receiving data from environmental sensors on an IoT device, the dashboard may automatically generate fields to showcase temperature, humidity, and air quality readings. It could then produce real-time charts that visualize these metrics over time, highlighting trends and anomalies. Furthermore, the dashboard might aggregate data from multiple devices to present averaged values and detect outliers, providing a comprehensive overview of the network's health. Interactive widgets could allow users to drill down into specific data points, while predictive analytics could forecast future trends and maintenance needs based on historical data. This automated configuration not only enhances data visibility but also empowers users with actionable insights.

The IoT operations dashboard can also make its data available in sensor fusion pipelines. Sensor fusion pipelines are systems that combine data from multiple sensors to produce more accurate, reliable, and comprehensive information, enhancing the quality and usability of the aggregated data through techniques such as filtering, statistical analysis, and machine learning. In this manner, the IoT operations dashboard can harmonize multiple types of IoT devices and ensure their security and efficiency of use is optimized across the network. For example, the IoT operations dashboard can use data from MUD files to automatically configure network policies that restrict device communications to known and trusted endpoints, enhancing security by preventing unauthorized access. Additionally, during the onboarding process, the dashboard can cross-reference device attributes with existing security profiles to streamline the integration of new devices, ensuring they adhere to established security protocols and operational standards. The IoT operations dashboard can also use data from multiple IoT devices for data correlation purposes outside of the security or onboarding areas. For example, the IoT operations dashboard can correlate temperature and humidity data from environmental sensors with operational data from industrial machinery to predict maintenance needs and prevent equipment failures, or it can integrate motion sensor data with video surveillance feeds to enhance security monitoring and threat detection.

Figure 4A:
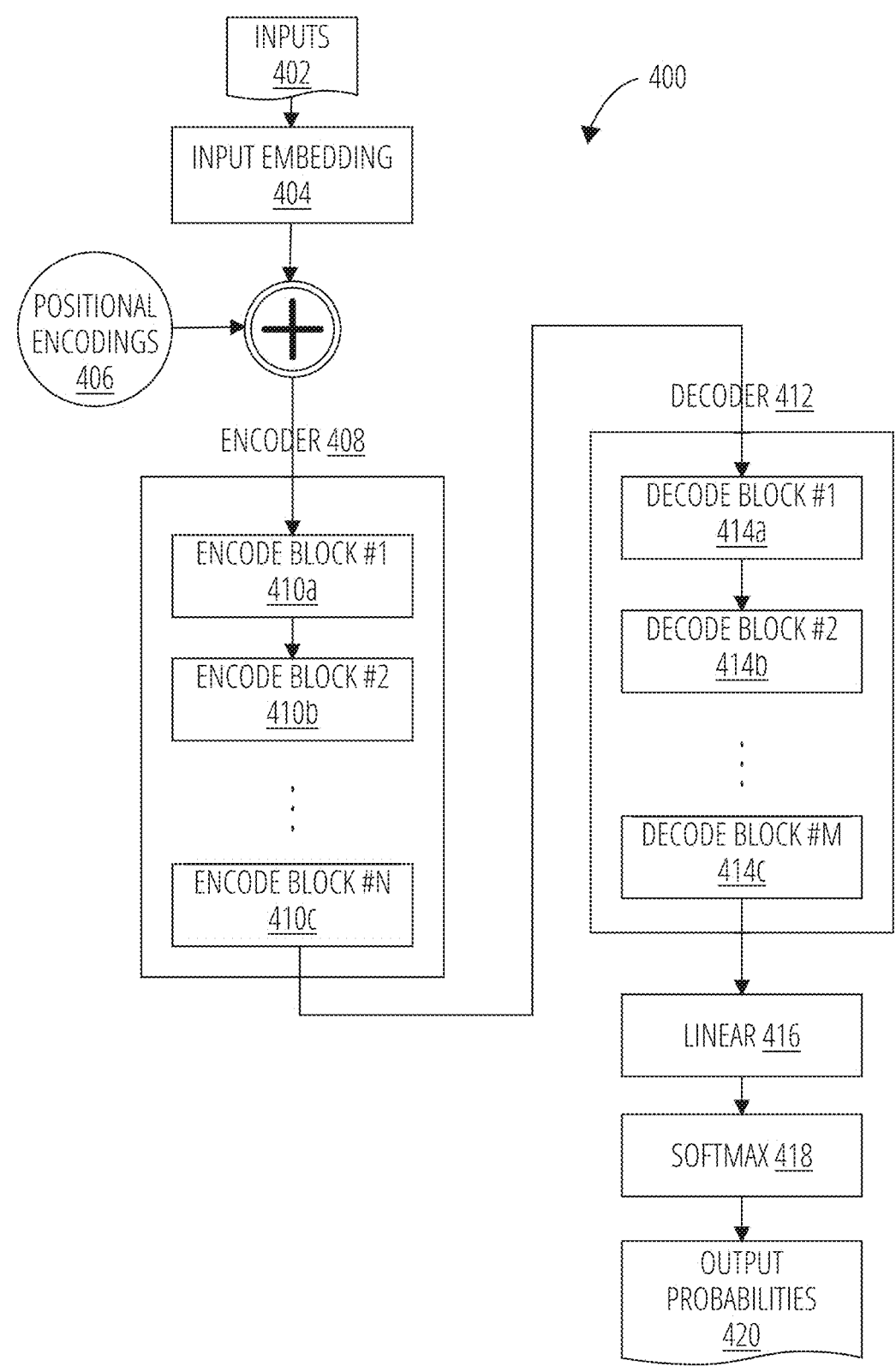
FIG. 4A illustrates a block diagram for an example of a transformer neural network architecture in accordance with some embodiments of the present technology.

FIG. 4A illustrates a block diagram for an example of a transformer neural network architecture, in accordance with certain embodiments. A transformer architecture 400 can be used by a prompt generator, such as a Generative Pre-trained Transformer (GPT) model. Additionally or alternatively, the prompt generator can include a Bidirectional Encoder Representations from Transformers (BERT) model. According to certain non-limiting examples, the transformer architecture 400 is illustrated in FIG. 4A through FIG. 4C as including inputs 402, an input embedding block 404, positional encodings 406, an encoder 408 (e.g., encode blocks 410a, 410b, and 410c), a decoder 412 (e.g., decode blocks 414a, 414b, and 414c), a linear block 416, a softmax block 418, and output probabilities 420.

The input embedding block 404 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 404 can be learned embeddings to convert the input tokens and output tokens to vectors of dimension that have the same dimension as the positional encodings, for example.

The positional encodings 406 provide information about the relative or absolute position of the tokens in the sequence. According to certain non-limiting examples, the positional encodings 406 can be provided by adding positional encodings to the input embeddings at the inputs to the encoder 408 and decoder 412. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 4B:
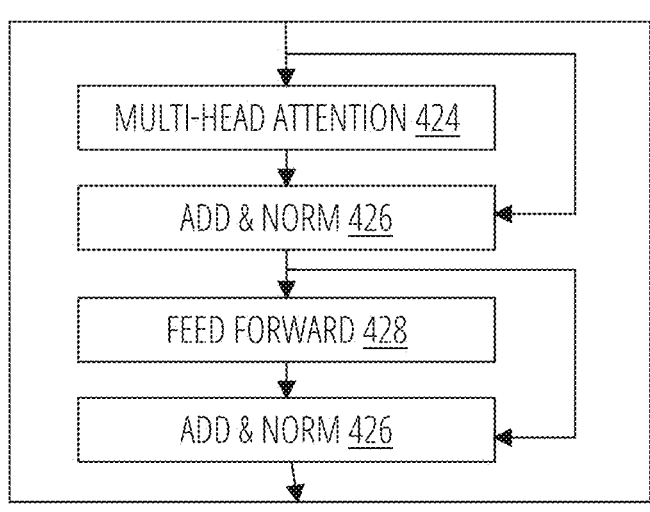
FIG. 4B illustrates a block diagram for an example of an encoder of the transformer neural network architecture in accordance with some embodiments of the present technology.
Figure 4C:
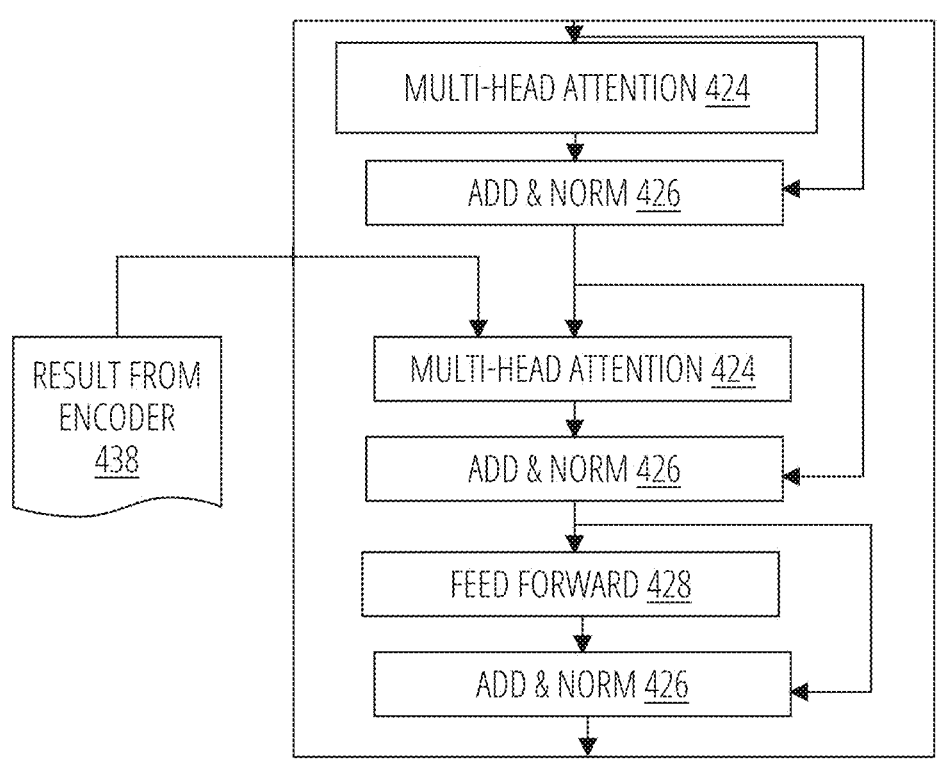
FIG. 4C illustrates a block diagram for an example of a decoder of the transformer neural network architecture in accordance with some embodiments of the present technology.

FIG. 4B illustrates a block diagram for an example of an encoder of the transformer neural network architecture, in accordance with certain embodiments.

The encoder 408 uses stacked self-attention and point-wise, fully connected layers. The encoder 408 can be a stack of N identical layers (e.g., N=6), and each layer is an encode block, as illustrated by encode block 410a shown in FIG. 4B. Each encode block 410a-410c has two sub-layers: (i) a first sub-layer has a multi-head attention block 424 and (ii) a second sub-layer has a feed forward block 428, which can be a position-wise fully connected feed-forward network. The feed forward block 428 can use a rectified linear unit (ReLU). Result(s) from the encoder can be input into the multi-head attention block 424, as shown by the results from encoder block result from encoder 438.

The encoder 408 uses a residual connection around each of the two sub-layers, followed by an add & norm block 426, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer Layer-Norm(x+Sublayer(x)), where Sublayer(x) is the function implemented by the sub-layer). To facilitate these residual connections, all sub-layers in the model, as well as the embedding layers, produce output data having a same dimension.

FIG. 4C illustrates a block diagram for an example of a decoder of the transformer neural network architecture, in accordance with certain embodiments.

Similar to encoder 408, decoder 412 uses stacked self-attention and point-wise, fully connected layers. The decoder 412 can also be a stack of M identical layers (e.g., M=6), and each layer is a decode block, as illustrated by decode block 414a shown in FIG. 4C. In addition to the two sub-layers (i.e., the sublayer with the multi-head attention block 424 and the sub-layer with the feed-forward block) found in the encode block 410a, the decode block 414a can include a third sub-layer, which performs multi-head attention over the output of the encoder stack. Similar to the encoder 408, the decoder 412 uses residual connections around each of the sub-layers, followed by layer normalization. Additionally, the sub-layer with the multi-head attention block 424 can be modified in the decoder stack to prevent positions from attending to subsequent positions. This masking, combined with the fact that the output embeddings are offset by one position, ensures that the predictions for position 'i' can depend only on the known output data at positions less than i.

The linear block 416 can be a learned linear transformation. For example, when the transformer architecture 400 is being used to translate from a first language into a second language, the linear block 416 projects the output from the last decode block 414c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 418 then turns the scores from the linear block 416 into output probabilities 420 (which add up to 1.0). In each position, the index provides for the word with the highest probability, and then map that index to the corresponding word in the vocabulary. Those words then form the output sequence of the transformer architecture 400. The softmax operation is applied to the output from linear block 416 to convert the raw numbers into the output probabilities 420 (e.g., token probabilities), which are used in the process of generating a summary based on the prompt generator, generating a policy.

Figure 5:
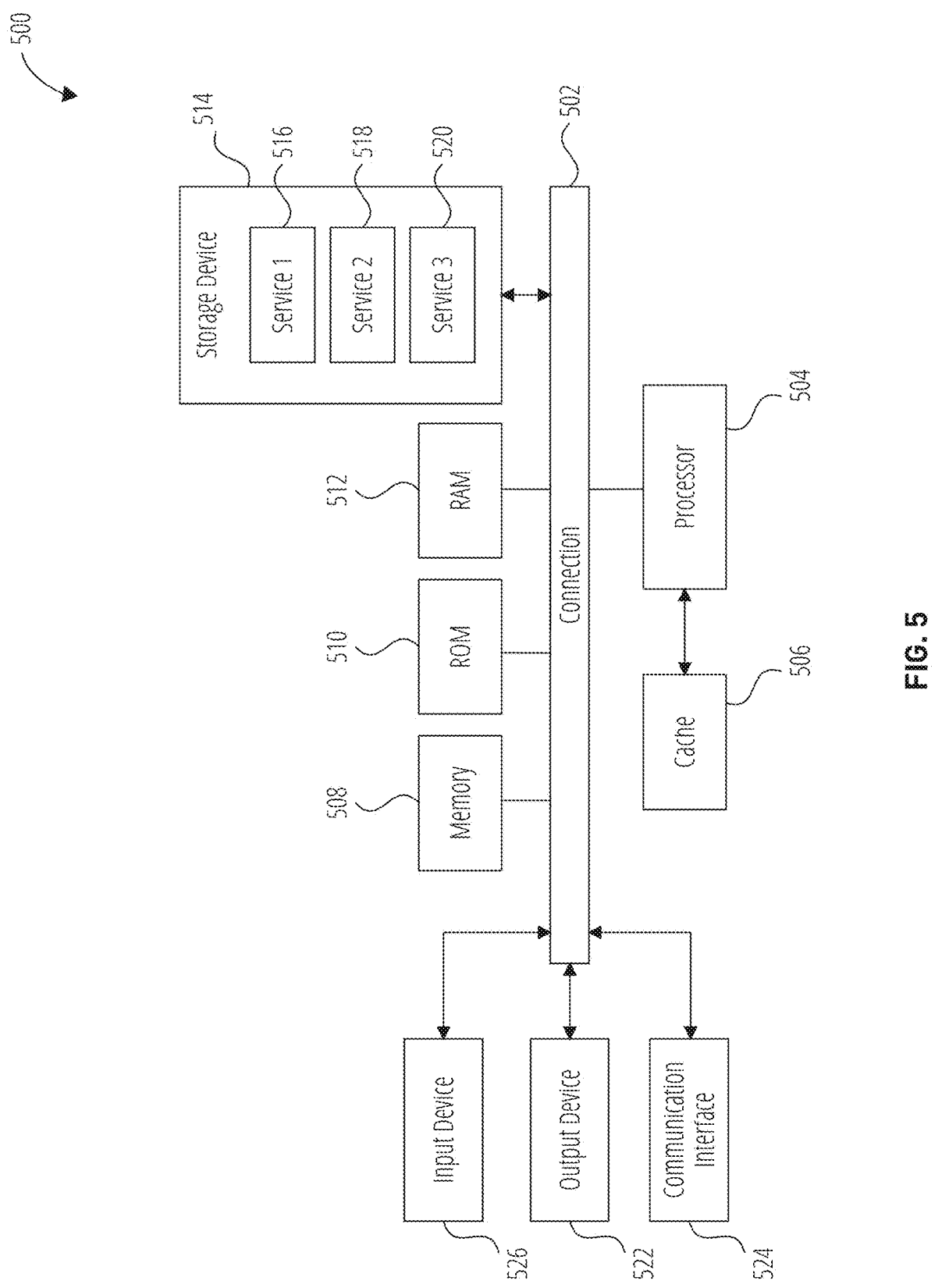
FIG. 5 shows an example of a system for implementing certain aspects of the present technology.

FIG. 5 shows an example of computing system 500, which can be for example any computing device making up the server system 104, the IoT device(s) 108, proxy server 106, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method comprising receiving data indicating attributes of a first internet-of-things device (first IoT device); prompting a generative model to create a file based on the data; determining, by a network controller, that a second IoT device is a same type of device as the first IoT device; and associating the file with the second IoT device.

Aspect 2. The method of Aspect 1, wherein the file is a Manufacturer Usage Description file (MUD file) and wherein associating the file with the second IoT device includes storing the MUD file on a MUD server and implementing a MUD policy based on the MUD file.

Aspect 3. The method of Aspect 1, wherein the data includes connectivity data, attribute data, and attribute access procedure data.

Aspect 4. The method of Aspect 1, wherein receiving the data includes analyzing data packets from the first IoT device or the second IoT device with a Transmission Control Protocol dump (TCP dump).

Aspect 5. The method of Aspect 1, wherein the data is a manual identifying attributes of the first IoT device.

Aspect 6. The method of Aspect 1, further comprising uploading the file to an IoT operations dashboard to input the attributes of the first IoT device into the IoT operations dashboard.

Aspect 7. The method of Aspect 1, further comprising training the generative model with training files that are a same format as the file.

Aspect 8. A network controller comprising: a storage configured to store instructions; and at least one processor configured to execute the instructions and cause the at least one processor to: receive data indicating attributes of a first internet-of-things device (first IoT device); prompt a generative model to create a file based on the data; determine that a second IoT device is a same type of device as the first IoT device; and associate the file with the second IoT device.

Aspect 9. The network controller of Aspect 8, wherein the file is a Manufacturer Usage Description file (MUD file) and wherein associating the file with the second IoT device includes storing the MUD file on a MUD server and implementing a MUD policy based on the MUD file.

Aspect 10. The network controller of Aspect 8, wherein the data includes connectivity data, attribute data, and attribute access procedure data.

Aspect 11. The network controller of Aspect 8, wherein receiving the data includes analyzing data packets from the first IoT device or the second IoT device with a TCP dump.

Aspect 12. The network controller of Aspect 8, wherein the data is a manual identifying attributes of a the first IoT device.

Aspect 13. The network controller of Aspect 8, wherein the at least one processor is configured to execute the instructions and further cause the at least one processor to upload the file to an IoT operations dashboard to input the attributes of the first IoT device into the IoT operations dashboard.

Aspect 14. The network controller of Aspect 8, wherein the at least one processor is configured to execute the instructions and further cause the at least one processor to train the generative model with training files that are a same format as the file.

Aspect 15. A non-transitory computer-readable storage medium including instructions that, when executed by at least one processor, cause the at least one processor to: receive data indicating attributes of a first internet-of-things device (first IoT device); prompt a generative model to create a file based on the data; determine that a second IoT device is a same type of device as the first IoT device; and associate the file with the second IoT device.

Aspect 16. The non-transitory computer-readable storage medium of Aspect 15, wherein the file is a Manufacturer Usage Description file (MUD file) and wherein associating the file with the second IoT device includes storing the MUD file on a MUD server and implementing a MUD policy based on the MUD file.

Aspect 17. The non-transitory computer-readable storage medium of Aspect 15, wherein the data includes connectivity data, attribute data, and attribute access procedure data.

Aspect 18. The non-transitory computer-readable storage medium of Aspect 15, wherein receiving the data includes analyzing data packets from the first IoT device or the second IoT device, respectively, with a TCP dump.

Aspect 19. The non-transitory computer-readable storage medium of Aspect 15, wherein the data is a manual identifying attributes of the first IoT device.

Aspect 20. The non-transitory computer-readable storage medium of Aspect 15, wherein the instructions further cause the at least one processor to upload the file to an IoT operations dashboard to input the attributes of the first IoT device into the IoT operations dashboard.

What is claimed is:

1. A method comprising:

receiving data indicating attributes of a first internet-of-things device (first IoT device);

prompting a generative model to create a file based on the data, wherein the file is a Manufacturer Usage Description (MUD) file and specifies permitted communications and operational parameters of the first IoT device;

determining, by a network controller, that a second IoT device is a same type of device as the first IoT device by analyzing the second IoT device and concluding the second IoT device includes similar attributes as the first IoT device; and associating the file with the second IoT device, including storing the MUD file on a MUD server and implementing a MUD policy based on the MUD file for the second IoT device by configuring network equipment to enforce the permitted communications.

2. The method of claim 1, wherein the data includes connectivity data, attribute data, and attribute access procedure data.

3. The method of claim 1, wherein receiving the data includes analyzing data packets from the first IoT device or the second IoT device with a Transmission Control Protocol dump (TCP dump).

4. The method of claim 1, wherein the data is a manual identifying attributes of the first IoT device.

5. The method of claim 1, further comprising uploading the file to an IoT operations dashboard to input the attributes of the first IoT device into the IoT operations dashboard.

6. The method of claim 1, further comprising training the generative model with training files that are a same format as the file.

7. A network controller comprising:

a storage configured to store instructions; and at least one processor configured to execute the instructions and cause the at least one processor to:

receive data indicating attributes of a first internet-of-things device (first IoT device);

prompt a generative model to create a file based on the data, wherein the file is a Manufacturer Usage Description (MUD) file and specifies permitted communications and operational parameters of the first IoT device;

determine that a second IoT device is a same type of device as the first IoT device by analyzing the second IoT device and concluding the second IoT device includes similar attributes as the first IoT device; and associate the file with the second IT device, including storing the MUD file on a MUD server and implementing a MUD policy based on the MUD file for the second IoT device by configuring network equipment to enforce the permitted communications.

8. The network controller of claim 7, wherein the data includes connectivity data, attribute data, and attribute access procedure data.

9. The network controller of claim 7, wherein receiving the data includes analyzing data packets from the first IoT device or the second IoT device with a TCP dump.

10. The network controller of claim 7, wherein the data is a manual identifying attributes of a the first IoT device.

11. The network controller of claim 7, wherein the at least one processor is configured to execute the instructions and further cause the at least one processor to upload the file to an IoT operations dashboard to input the attributes of the first IoT device into the IoT operations dashboard.

12. The network controller of claim 7, wherein the at least one processor is configured to execute the instructions and further cause the at least one processor to train the generative model with training files that are a same format as the file.

13. A non-transitory computer-readable storage medium including instructions that, when executed by at least one processor, cause the at least one processor to:

receive data indicating attributes of a first internet-of-things device (first IoT device);

prompt a generative model to create a file based on the data, wherein the file is a Manufacturer Usage Description (MUD) file and specifies permitted communications and operational parameters of the first IoT device;

determine that a second IoT device is a same type of device as the first IoT device by analyzing the second IoT device and concluding the second IoT device includes similar attributes as the first IoT device; and associate the file with the second IoT device, including storing the MUD file on a MUD server and implementing a MUD policy based on the MUD file for the second IoT device by configuring network equipment to enforce the permitted communications.

14. The non-transitory computer-readable storage medium of claim 13, wherein the data includes connectivity data, attribute data, and attribute access procedure data.

15. The non-transitory computer-readable storage medium of claim 13, wherein receiving the data includes analyzing data packets from the first IoT device or the second IoT device, respectively, with a TCP dump.

16. The non-transitory computer-readable storage medium of claim 13, wherein the data is a manual identifying attributes of the first IoT device.

17. The non-transitory computer-readable storage medium of claim 13, wherein the instructions further cause the at least one processor to upload the file to an IoT operations dashboard to input the attributes of the first IoT device into the IoT operations dashboard.

\* \* \* \* \*